May 12, 1942.   I. G. H. HERWIG   2,282,761
AUTO VEHICLE SAFETY SIGNAL
Filed Aug. 8, 1939   4 Sheets-Sheet 1
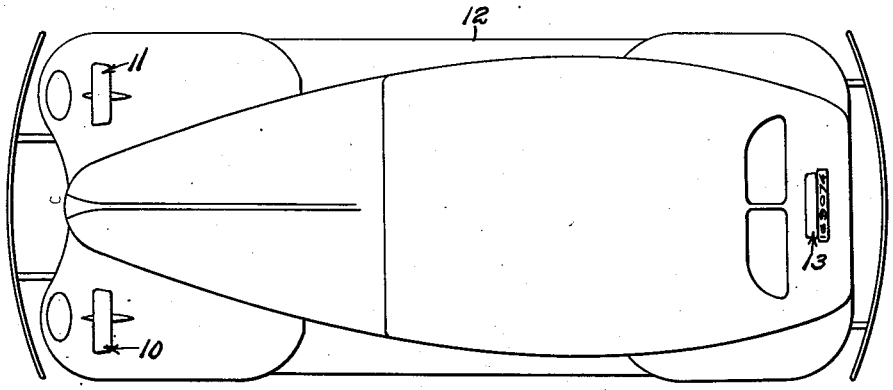
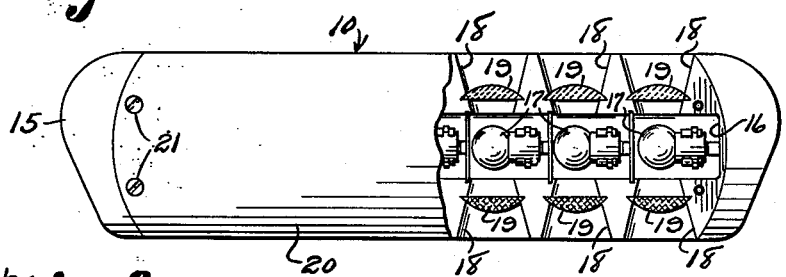
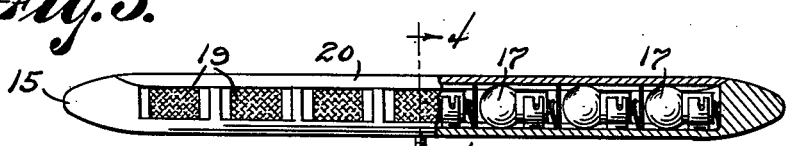
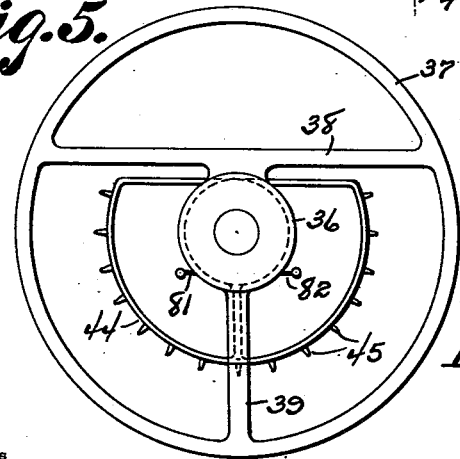
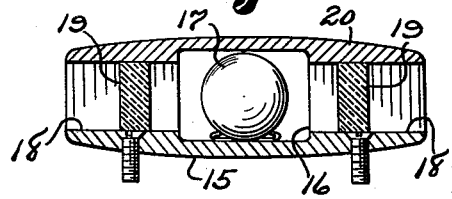
Irvin G. H. Herwig
INVENTOR
BY Victor J. Evans & Co.
ATTORNEYS May 12, 1942.  I. G. H. HERWIG  2,282,761
AUTO VEHICLE SAFETY SIGNAL
Filed Aug. 8, 1939  4 Sheets-Sheet 2

Irvin G. H. Herwig
INVENTOR
BY Victor J. Evans & Co.
ATTORNEYS
WITNESS

May 12, 1942.  I. G. H. HERWIG  2,282,761
AUTO VEHICLE SAFETY SIGNAL
Filed Aug. 8, 1939  4 Sheets-Sheet 3

Irvin G. H. Herwig INVENTOR
BY Victor J. Evans & Co.
ATTORNEYS

WITNESS

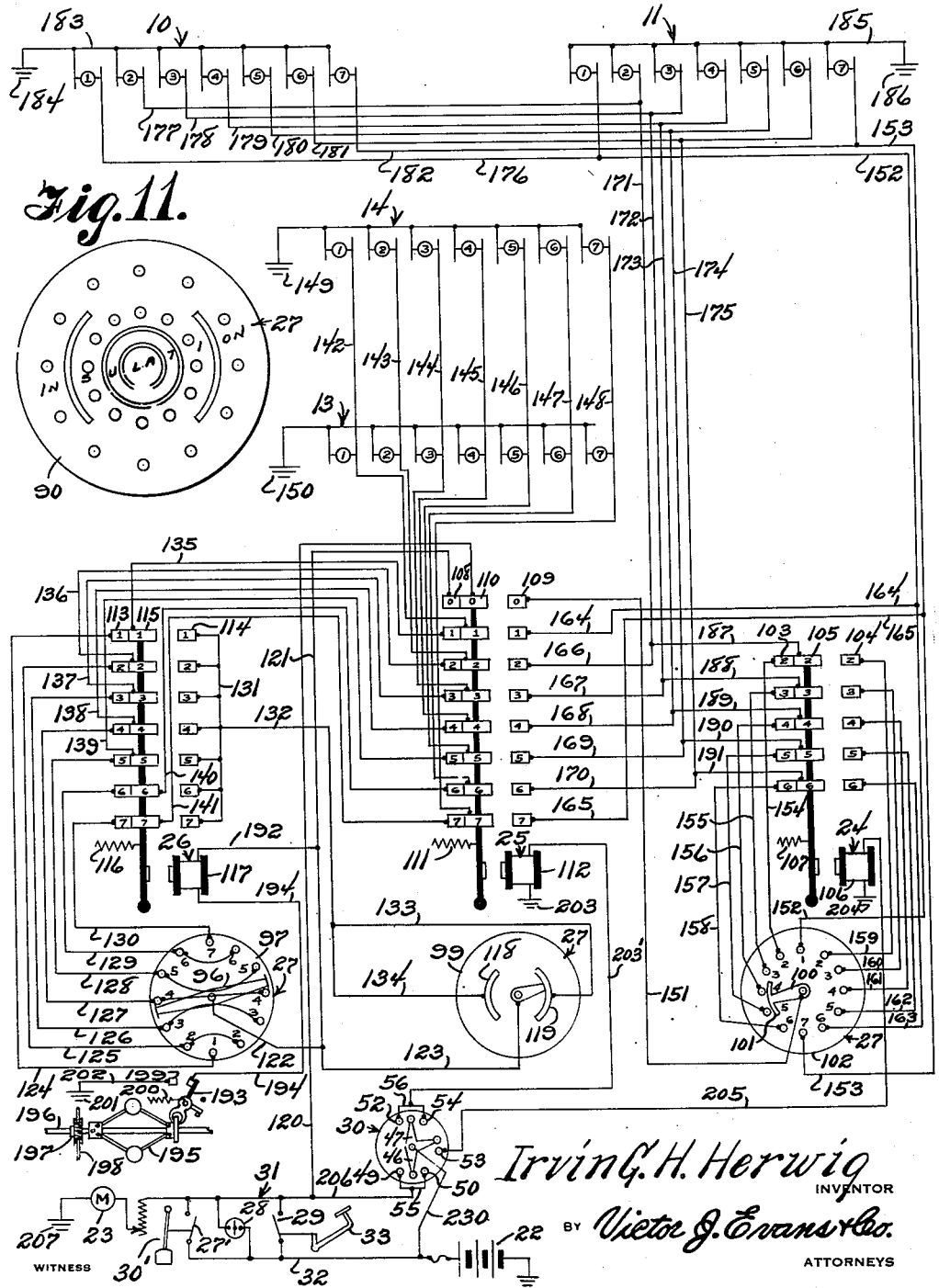

Patented May 12, 1942

2,282,761

UNITED STATES PATENT OFFICE 2,282,761

AUTO VEHICLE SAFETY SIGNAL

Irvin G. H. Herwig, Ohlman, Ill.

Application August 8, 1939, Serial No. 289,074

7 Claims. (Cl. 177—337)

My invention relates to new and useful improvements in signal devices.

An important object of my invention is to provide a signal device that is particularly adapted to be applied to automotive vehicles and that embodies separate banks of lamps mounted on the front, rear and dashboard of the vehicle, said lamps being energized by manually and automatically controlled switch means to indicate the intentions of the driver to nearby motorists and pedestrians.

Another object of my invention is to provide a signal device of the above-mentioned character wherein the individual lamps comprising the aforesaid banks will be progressively illuminated either to the right or to the left in accordance with the direction of the turn which the driver intends to make.

Still another object of my invention is to provide a signal device of the above-mentioned character wherein the individual lamps of the rear and dashboard banks will be seriately and simultaneously illuminated from left to right and from right to left, thus creating a crisscross effect to apprise any person at the rear of the vehicle of the driver's intention to stop.

Yet another object of my invention is to provide a signal device of the above-mentioned character wherein the flashing signal will be automatically given when the vehicle is in reverse gear, thus notifying persons at the rear of the vehicle of the driver's intention to back the same.

A further object of my invention is to provide a signal device of the above-mentioned character wherein the crisscross signal will automatically be given when the foot brake of the vehicle is applied, and as soon as the forward motion of the vehicle has been sufficiently arrested, the crisscross signal will cease and the rear and dashboard banks will automatically flash intermittently.

A yet further object of my invention is to provide a signal device that may be easily and expeditiously applied to any style or design of vehicle and that is efficient and efficacious in the performance of its duties.

Other objects and advantages will be apparent during the course of the following description.

Figure 6:
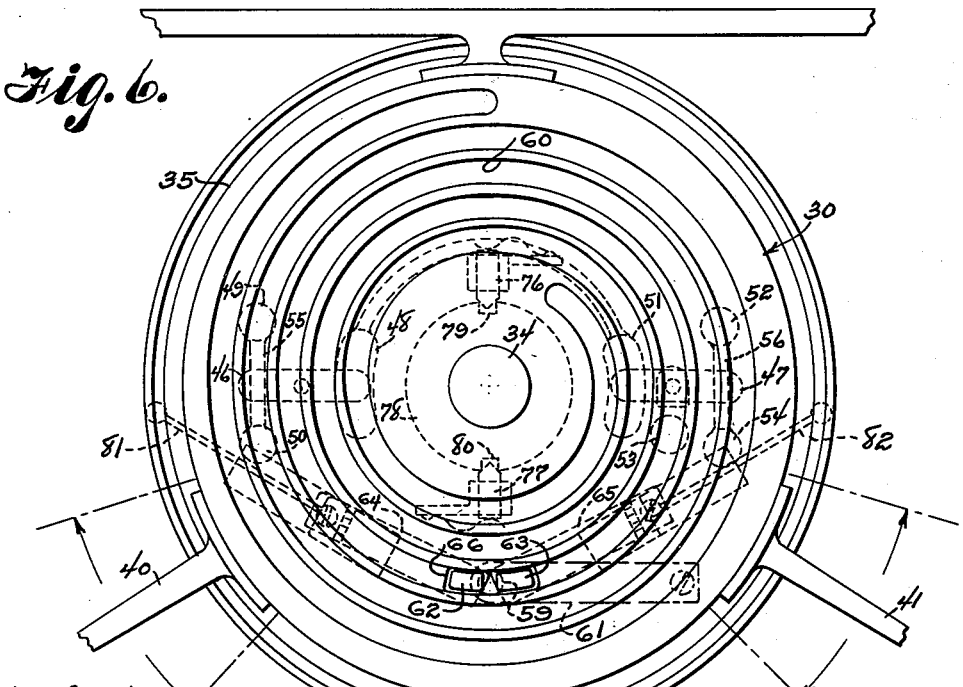
Figure 7:
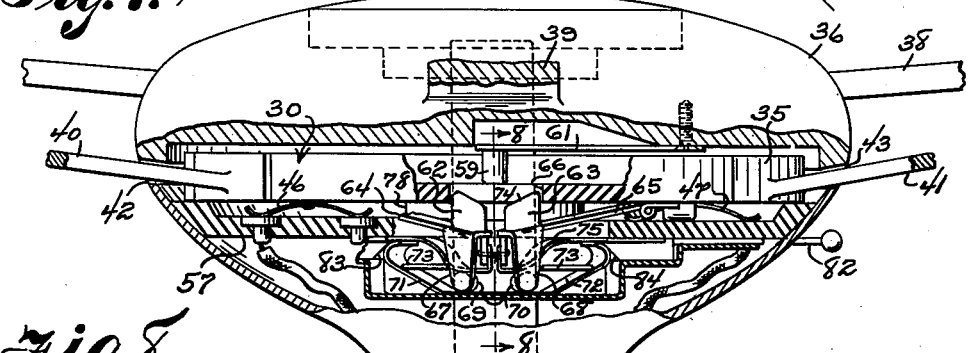
Figure 8:
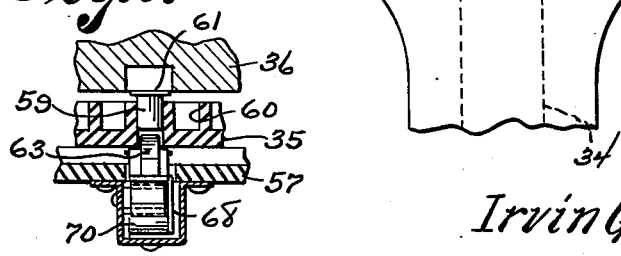
Figure 10:
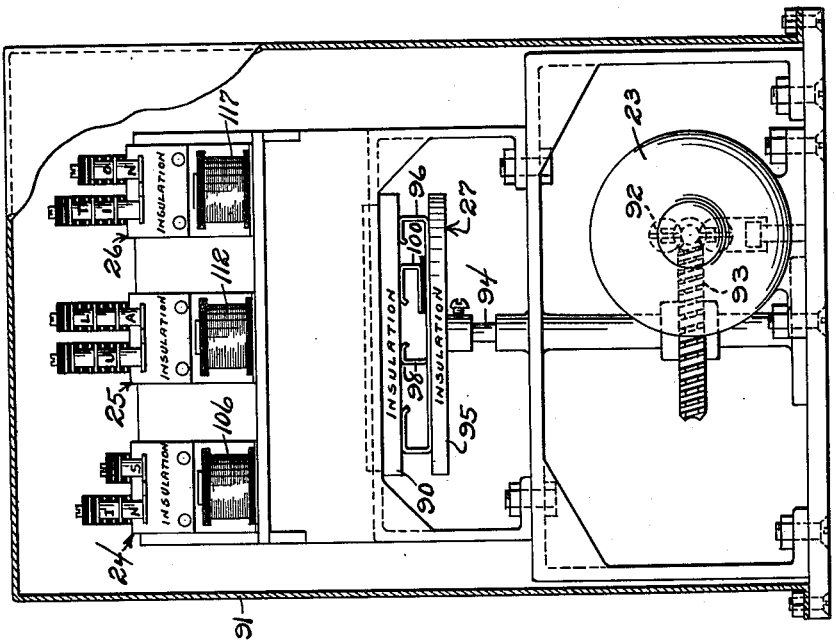
Figure 9:
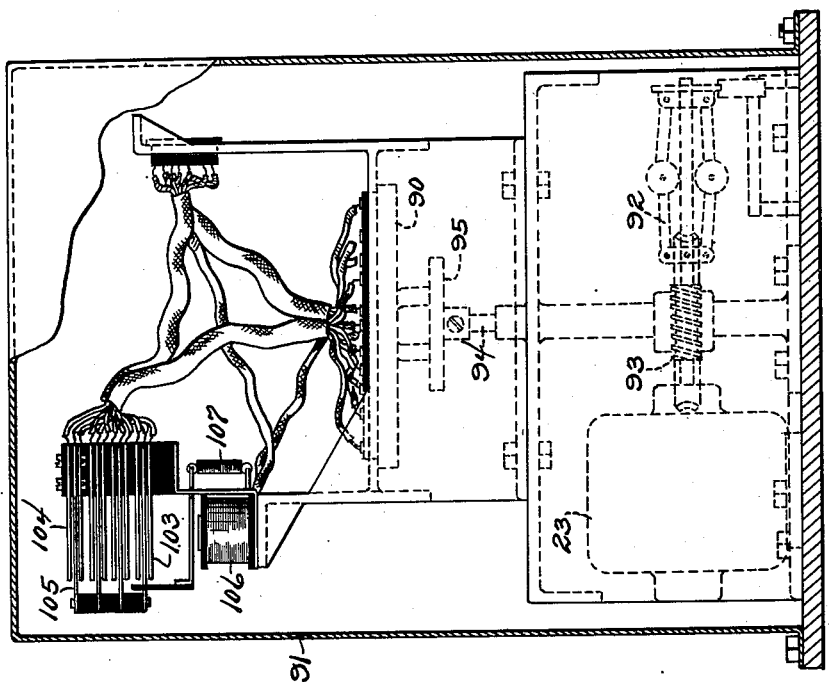

In the drawings, forming a part of this specification, and in which like numerals are employed to designate like parts throughout the same, Figure 1 is a top plan view of an automotive vehicle having the signal device embodying my invention incorporated therewith, Figure 2 is a top plan view, showing parts broken away, of a lamp assembly embodying a part of my invention, Figure 3 is a front elevation of the same, Figure 4 is a vertical sectional view, taken on the line 4—4 of Figure 3, Figure 5 is a top plan view of the steering wheel assembly of the vehicle, and showing a switch member embodying a part of my invention incorporated therewith, Figure 6 is a fragmentary top plan view of the steering wheel assembly, and with the steering wheel hub removed therefrom, Figure 7 is a side elevation, showing parts broken away, of the same, Figure 8 is a fragmentary vertical sectional view taken on the line 8—8 of Figure 7, Figure 9 is a side elevation, showing parts broken away, and illustrating the current translating and controlling apparatus embodying a part of my invention, Figure 10 is a front elevation of the same, Figure 11 is a top plan view of the commutator plate embodying a part of my invention, and Figure 12 is a schematic wiring diagram illustrating the electric circuits embodying my invention.

The signal device comprising generally, banks of lamps 10 and 11 preferably mounted on the front fenders of the vehicle 12, a bank of lamps 13 mounted at the rear of the vehicle and a bank of lamps 14 positioned on the dashboard thereof.

The lamps are mounted in an elongated substantially flat casing 15 formed with a medial recess 16 extending substantially the full length thereof to provide a receptacle for the plurality of lamps 17. The recess 16 opens outwardly of the casing through the transverse inwardly convergent passages 18 positioned in opposed relation at each side of the casing, opposite pairs aligning with one of the lamps 17 and having a prism 19 positioned transversely thereof to focus the beam of light emitted by the lamps. The cover 20 closes the open side of the casing and is held thereon by means of the threaded screws 21, or the like.

For the purpose of exemplification I have shown each of the casings 15 as containing 7 lamps, however, it is to be understood that the number may be varied to suit the taste of the interested party. The banks of lamps 10, 11 and 13, 14 are all identical in their construction and the front banks 10 and 11 and rear bank 13 are preferably imbedded in the front fenders and rear body portion of the vehicle, respectively, in a manner to substantially conform with the design and appearance of the same. The passages 18 may be positioned just above the plane of the body so that the lamps 17 may be viewed either from the front or the rear.

A storage battery 22 may be mounted at any convenient place on the vehicle and is adapted to energize the electric motor 23 and the various electric circuits hereinafter described. The electrical translating devices are exemplified by the double throw relays 24, 25 and 26 which control the flow of current to each of the lamps in the banks 10, 11, 13 and 14, and a commutator 27 is actuated through a suitable reduction gearing by the motor 23. The commutator is adapted to energize the banks of lamps in a preselected sequence through the relays 24, 25 and 26, in accordance with the signal which the driver desires to convey to nearby motorists and pedestrians.

The current from the battery 22 is controlled by the four switches 27', 28, 29 and 30 which connect the main conductor 31 and conductor 32. The switches are normally open, and the switch 27' is actuated by the gear shift rod 30' to connect the battery to the conductor 31 when the gear shift lever is shifted into the reverse position. The switch 28 is a manual switch preferably mounted on the dashboard of the vehicle and is intended to be used when the vehicle is stalled or has stopped in a line of traffic. The switch 29 is actuated by the foot brake pedal 33 which connects the battery circuit to the main conductor 31 when the foot brake pedal is depressed. The switch 30 is mounted on the steering shaft 34 of the vehicle, as illustrated in Figures 6 and 7.

The steering wheel comprises the conventional rim 37 having the transverse spoke 38 and the radial spoke 39 integrally connecting the same to the hub 36. The switch 30 includes an insulated circular disk 35 mounted for limited independent rotation on the steering shaft 34 below the hub 36, said disk having spokes 40 and 41 projecting exteriorly of the hub casing through the slots 42 and 43 to engage the segmental rim 44 positioned below and concentric to the steering wheel rim 37. The rim 44 is provided with a plurality of spaced lugs 45 adapted to be engaged by the fingers of the driver as he rotates the steering wheel; thus, as the driver rotates the wheel to make either a right or left turn, he may easily rotate the rim 44 either to the right or left without removing either hand from the wheel. Spring contact arms 46 and 47 are mounted on the underside of the disk 35 at diametrically opposed sides thereof. The inner end of the contact arm 46 slidably engages the elongated contact 48 at all times during the rotation of disk 35, and the outer end thereof engages the contact 49 when the disk is rotated to the right and the contact 50 when the disk is rotated to the left. The inner end of the spring contact arm 47 slidably engages the elongated contact 51 at all times during the rotation of the disk and the outer end thereof engages the contact 52 when the disk is rotated to the left and the contacts 53 and 54 when the disk is rotated to the right. Contacts 49 and 50 are connected by a conductor 55, contacts 52 and 54 are connected by the conductor 56, and all of the contacts 48, 49, 50, 51, 52, 53 and 54 are mounted in a stationary insulated disk 57 positioned in the hub casing subjacent to the disk 35. It may thus be seen that while the contact arms do not normally engage the outer row of contacts, the driver may close a circuit through the above-mentioned contacts by rotating the rim 44 a slight distance either to the right or to the left.

I have provided an automatic means for returning the disk 44 to position the said contacts in the central, or open position after each rotation of the disk. The automatic return includes a dog pin 59 adapted to ride in a spiral track 60 in the upper surface of the disk 35, said pin having a lateral arm 61 pivotally mounted to the hub 36. The pin is normally positioned midway of the spiral track and, as the steering wheel is rotated, the pin will ride in the track in the direction of the inner or outer extremity thereof. Catch lugs 62 and 63 are hingedly secured to the underside of the disk 35 by arms 64 and 65 and are normally positioned in an elongated slot 66 extending through the disk medianly of the track 60 and at either side and below the dog pin 59. Brackets 67 and 68 depend from the catch lugs and carry transverse guide pins 69 and 70 which ride in the tracks 71 and 72 to move the lugs upwardly and into the path of the dog pin 59. If the disk 35 is turned to the left, the guide pin 70 will ride on the upwardly disposed track 72 to elevate the catch lug 63 into the path of the dog pin and be held in the elevated position by the transverse baffle plate 73. Because of the bevelled face 74 of the catch lug the pin will depress the same against the resilient action of the spring arm 61 when the disk 35 is first being turned, but as soon as the driver reversely rotates the steering wheel and returns the pin to the normal position, the dog pin will engage the projecting catch lug to reversely rotate the disk 35 into the initial position. As the disk 35 rotates toward the normal position, the guide pin 70 will ride downwardly on the upper track 75 to once more occupy its normal position in the slot 66 below the dog pin, as illustrated in Figure 7. If the wheel is turned to the right the guide pin 69 will operate in the same manner in the track 71 to elevate the catch lug 62 into the path of the dog pin, and as the pin returns to the initial position, it will engage the projecting dog pin 62 to reversely rotate the disk into the initial position.

To assure the correct positioning of the disk upon its return to the initial position, I have provided spring pressed detents 76 and 77 mounted on the stationary plate 57 at diametrically opposed sides of the circular plate 78 which is carried by the disk and is provided with diametrically opposed recesses 79 and 80 into which the plungers are forced to assure the proper return of the disk. The inner ends of the plungers are preferably formed with blunt points so that they may be easily retracted from the recesses upon actuation of the disk.

The manually actuated rods 81 and 82 project radially from the steering casing and are formed at the inner ends thereof with bevelled portions 83 and 84 which engage the tracks 71 and 72, respectively, so that upon inward actuation of the rods, the bevelled ends will depress the tracks to hold the catch lugs 62 and 63 in the lower position and out of the path of the dog pin 59. It will then be necessary that the driver of the vehicle manually return the disk 35 to the initial position after each rotation thereof.

The motor 23, relays 24, 25, and 26 and commutator 90 are mounted in the housing 91 which may be suitably mounted at any convenient place on the vehicle. The motor 23 is preferably shunt wound to make it more adaptable for highly intermittent service, and is provided with a governor control 92 to maintain uniform speed of rotation under varying electrical loads. The motor shaft is provided with a worm reduction gearing 93 adapted to engage the gearing of the vertical shaft 94 to rotate the same at a constant speed. The insulated commutator plate 95 is mounted on the upper end of the shaft 94 and carries a substantially U-shaped brush 96, the ends of which engage the contact circle 97. A brush 98 is maintained in engagement with the contact circle 99, and a brush 100 having substantially T-shaped arcuate head 101 is adapted to contact the commutator circle 102. The contact circle 97 is provided with 12 equi-spaced contacts so that, as the brush 96 rotates in a clockwise direction, the ends thereof will seriately engage diametrically opposed contacts 7—1, 6—2, 5—3, 4—4, 3—5, and 2—6 during each revolution thereof. The contacts 1 and 7 have single connections and the contacts 6—6, 5—5, 4—4, 3—3, and 2—2 are connected in series. The commutator circle 99 is provided with spaced arcuate contacts 118 and 119 adapted to be alternately engaged by the brush 98 as it revolves in a clockwise direction. The commutator circle 102 is provided with 12 equi-spaced contacts adapted to be progressively engaged by the head 101 of the brush 100 during each complete revolution thereof. The head 101 is of sufficient length to engage at least two of the adjacent points at all times, as illustrated in Figure 12.

The five pole double throw relay 24 comprises spaced banks of contacts 103 and 104 engageable by the pivoted armature 105 which is actuated by the electromagnet 106. When the electromagnet 106 is not energized the armature 105 is normally held in engagement with the bank of contacts 103 by a coil spring 107. The eight pole double throw relay 25 similarly comprises spaced banks of contacts 108 and 109 engageable by the pivoted armature 110 which is normally held in engagement with the bank 108 by the coil spring 111 and adapted to be pivotally moved into engagement with the bank 109 by the energization of the electromagnet 112. The seven pole double throw relay 26 is provided with spaced banks of contacts 113 and 114; the pivoted armature 115 is normally held in engagement with the bank of contacts 113 by a coil spring 116 and is adapted to be pivoted into engagement with the contacts 114 by energization of the electromagnet 117.

The conductor 120 is connected at one end to the main conductor 31 and at the other end thereof to the zero contact plate of the armature 110 of relay 25, said relay being normally held in spring pressed engagement with the bank of contacts 108. The conductor 121 connects the number zero plate of the contact bank 108 to the contact brush 96 through conductor 122 and the contact brush 98 through conductor 123. The contact point number 1 of the commutator circle 97 is connected to the number 1 plate of the contact bank 113 of relay 26 by the conductor 124. Numbers 2, 3, 4, 5 and 6 contact points of the commutator circle are connected to the numbers 2, 3, 4, 5, and 6 contact plates of the contact bank 113 of relay 26 by conductors 125, 126, 127, 128, and 129, respectively; and the number 7 contact is connected to the number 7 plate of the contact bank 113 by the conductor 130.

The numbers 1, 2, 3, 4, 5, 6 and 7 contact plates of the contact bank 114 of relay 26 are connected by the conductor 131 and the conductor 132 is connected at one end to the conductor 131 and at the other end to the contact plates 118 and 119 by conductors 133 and 134.

The numbers 1, 2, 3, 4, 5, 6 and 7 contact plates of the armature 115 are connected to the numbers 1, 2, 3, 4, 5, 6, and 7 contact plates of the contact bank 108 of relay 25 by conductors 135, 136, 137, 138, 139, 140 and 141, respectively. The numbers 1, 2, 3, 4, 5, 6 and 7 contact plates of the armature 110 of relay 25 are connected to the numbers 1, 2, 3, 4, 5, 6 and 7 lamps of the rear and dashboard banks 13 and 14, respectively, by conductors 142, 143, 144, 145, 146, 147 and 148. The bank of dash lamps 14 is suitably grounded, as at 149; and the bank of rear lamps 13 is suitably grounded, as at 150.

The numbers 1 and 7 contacts of commutator circle 102 are connected to the numbers 1 and 7 lamps in the front banks 10 and 11 by conductors 152 and 153. The numbers —2, —3, —4, —5, and —6 contacts of the commutator circle 102 are connected to the numbers 2, 3, 4, 5, 6 contact plates of the contact bank 103 of relay 24 by conductors 154, 155, 156, 157, and 158, and the contacts 2, 3, 4, 5, and 6 of the commutator circle 102 are connected to the numbers 2, 3, 4, 5, and 6 contact plates of the contact bank 104 of relay 24 by conductors 159, 160, 161, 162, and 163.

The number zero contact plate of the contact bank 109 of relay 25 is connected to the brush 100 by conductor 151, and the numbers 1 and 7 contact plates of the contact bank 109 are connected to conductors 152 and 153 by conductors 164 and 165. Contact plates 2, 3, 4, 5, and 6 are connected to the numbers 2, 3, 4, 5, and 6 contact plates of the armature 105 of relay 24 by conductors 166, 167, 168, 169, and 170, and to the numbers 2, 3, 4, 5, and 6 lamps of the front banks 10 and 11 by conductors 171, 172, 173, 174, and 175, and conductors 176, 177, 178, 179, 180, 181 and 182. The lamps 1, 2, 3, 4, 5, 6 and 7 of the left bank 10 are connected by the conductor 183 which is grounded, as at 184, and the lamps 1, 2, 3, 4, 5, 6 and 7 of the right bank 11 are connected by the conductor 185 which is suitably grounded, as at 186. The numbers 2, 3, 4, 5, and 6 plates of the armature 105 of relay 24 are connected to the conductors 171, 172, 173, 174 and 175, and to the numbers 2, 3, 4, 5 and 6 plates of the contact bank 109 of relay 25 by conductors 187, 188, 189, 190, and 191.

The electromagnet 117 of relay 26 is connected to the conductor 121 by conductor 192 and to the governor controlled switch arm 193 by conductor 194. The switch arm 193 is pivotally actuated by the governor 195 rotatably mounted on the shaft 196. The worm gear 197, formed on the shaft 196, meshes with the speedometer cable 198 so that when the vehicle is travelling at a moderate rate of speed the governor will pivot the contact arm 193 away from contact 199; however, when the forward motion of the vehicle has been sufficiently checked, the governor 195 will slide longitudinally of the shaft 196 to permit the contact arm 193 to engage contact 199 by virtue of the resilient action of the coil spring 200. The contact 199 is connected to a suitable ground 201 by conductor 202.

The electromagnet 112 of relay 25 is connected to a suitable ground 203 and to the conductor 56 of the steering wheel switch 30 by the conductor 203'; and the electromagnet 106 of relay 24 has one terminal connected to the ground 204 and the other terminal thereof connected to the contact 53 of the steering wheel switch by means of the conductor 205. The contacts 49 and 50 of the steering wheel switch are connected to the main circuit 31 by conductor 206, and the contact arms 46 and 47 are connected to the conductor 32 by the conductor 230.

As illustrated in Figures 6 and 12, the steering wheel switch 30 is normally in an open position, and the switches 27', 28 and 29 are normally open to prevent current from the battery 22 from energizing any of the above-mentioned circuits. If the vehicle is travelling at a moderate rate of speed and the driver depresses the foot brake pedal 33 to slow the vehicle, the switch 29 will be closed to permit the current to flow from the battery through the switch, through the motor 23 and to the ground 207. The motor will rotate the commutator shaft 94 through the reduction gearing 93 and, as the commutator brush 96 revolves in a clockwise direction, it will progressively engage contacts 1—7, 6—2, 5—3, 4—4, 3—5, and 2—6. The governor 195 will operate to separate the switch arm 193 from contact 199, thus preventing the current from energizing the electromagnet 117 of relay 26; however, the current will flow along the conductor 120 to the number zero plates of the armature 110 and contact bank 108 of relay 25 and through conductors 121 and 122 to the commutator brush 96. When the commutator brush 96 is in engagement with the diametrically opposed contacts 1—7, current will flow through conductors 124 and 130 to the numbers 1 and 7 contact plates of the contact bank 113 of armature 115, through the numbers 1 and 7 contact plates of the armature 115, and through conductors 135 and 141 to the numbers 1 and 7 contact plates of the armature 110 and contact bank 108 of relay 25. From the numbers 1 and 7 contact plates of armature 110, the current will flow through conductors 142 and 148 to the numbers 1 and 7 lamps in the rear and dash lamp banks 13 and 14, and to ground at 149 and 150. When the commutator arm 96 rotates to engage the 6—2 contact of circle 97, the current will similarly be transmitted through relays 26 and 25 to the numbers 2 and 6 lamps of the rear and dash banks 13 and 14.

It may thus be seen that as the brush 96 revolves, the numbers 1 and 7 lamps of the banks 13 and 14 will illuminate, then the numbers 2 and 6 lamps, numbers 3 and 5 lamps, number 4 lamps, numbers 3 and 5 lamps and numbers 1 and 7 lamps in the order enumerated to effect a crisscross signal as the lights are progressively illuminated. This signal will notify the motorist at the rear of the vehicle that the vehicle is slowing down.

When the forward motion of the vehicle has been checked sufficiently to permit the governor 195 to engage the contact arm 193 with the contact 199, the current will flow from the conductor 121 through the electromagnet 117 of relay 26, through conductor 197, contact arm 193, and conductor 202 to the ground at 201. When the relay 117 is thus energized, the armature 115 will disengage from the contact bank 113 and move into engagement with the contact bank 114 so that the current flowing through the commutator circle 97 will be broken at relay 26 and directed to the commutator circle 99, through conductor 123 to the commutator brush 98. As the brush 98 rotates in a clockwise direction it will progressively engage the contacts 118 and 119, to permit current to intermittently flow through conductors 133, 134, and 132 to the contact bank 114 of relay 26. Inasmuch as the armature 115 is engaged with the contact bank 114 the current will flow through the conductors 135, 136, 137, 138, 139, 140 and 141 to the numbers 1, 2, 3, 4, 5, 6 and 7 contact plates of the contact bank 108 and armature 110 of relay 25. From relay 25 the current will be transmitted through conductors 142, 143, 144, 145, 146, 147 and 148 to all of the lamps in the rear and dash bank 13 and 14.

It may thus be seen that as the vehicle approaches a dead stop, the rear and dash banks of lamps will all flash intermittently as the commutator arm 98 alternately engages the contacts 118 and 119.

The rear and dash banks of lamps may be made to first flash intermittently when the vehicle is moving slowly and to flash the crisscross signal as the vehicle gains speed by closing the switch 27'. This switch is adapted to be closed when the gear lever 30' is moved to the reverse position thus apprising motorists at the rear of the vehicle that the same is being set in motion.

The manual switch 28 mounted on the dashboard of the vehicle may be closed at any time to cause the lamps to flash off and on if the vehicle is at rest, or to give the crisscross signal if the vehicle is in motion.

When the driver intends to make a left turn, he moves the rim 44 of the steering wheel switch toward the left as he rotates the steering wheel, to cause the spring contacts 46 and 47 to engage the contacts 50 and 52, respectively to close a circuit through the switch 30. The current may now flow from the battery through the conductor 230 to the spring contacts 46 and 47 and through the conductors 206 and 31 to energize the motor 23 which, in turn, will rotate the commutator 90. From the contact 52 the current will flow through the conductor 203' to energize the electromagnet 112 of relay 25 and from the electromagnet the current will flow to ground 203. From the conductor 206, the current will flow along the conductor 120 to the number zero contact plates of the armature and contact bank 110 and 109, respectively, of relay 25, and through conductor 151 to the commutator brush 100 of the commutator circle 102. The commutator circles 97 and 98 will be rendered inoperative by the energization of the electromagnet 112 of relay 25. If the head 101 of commutator brush 100 is in engagement with the numbers —2, —3 contacts of the contact circle 102, the current will be transmitted through conductors 154, 155 to the numbers 2 and 3 contact plates of the contact bank 103 and armature 105, respectively, of relay 24. From the contact plates 2 and 3 of the armature, the current will flow through conductors 187 and 188 where it will divide and flow along the conductors 171 and 172 to energize the numbers 2 and 3 lamps of the front banks 10 and 11 through conductors 177 and 178. The current will also flow through conductors 166 and 177 to the numbers 2 and 3 contact plates of the contact bank 109 and armature 110 of relay 25 where it will be conveyed to the numbers 2 and 3 lamps of the rear and dash banks 13 and 14 through conductors 143 and 144 and out through grounds 149 and 150. The numbers 1 and 7 contacts of the commutator circle 102 will energize the numbers 1 and 7 lamps of all the banks of lamps through conductors 152 and 153.

It may thus be seen as the commutator brush 100 progressively engages the contacts 1, —2, —3, —4, —5, —6, and 7 the numbers 1, 2, 3, 4, 5, 6, and 7 lamps of all of the banks 10, 11, 13 and 14 will be progressively illuminated in the order enumerated. At least two of the lamps will be illuminated at all times and the effect will be to create the appearance of a beam of light travelling from right to left to indicate that the driver intends to make a left turn. As the commutator arm 100 engages the contacts 6, 5, 4, 3, 2 the circuit will be broken by virtue of the fact that the armature 105 of relay 24 is in engagement with the contact bank 103 which in turn is connected to the contacts —2, —3, —4, —5 and —6, so that during this interval all lights will be extinguished. However, as soon as the commutator brush 100 again rotates into engagement with the number 1 contact the number 1 light of all the banks will flash and the beam of light will again traverse all of the banks from right to left. As soon as the driver reversely rotates the steering wheel to the normal position the contact arms 46 and 47 will be automatically returned to the neutral or initial position by the mechanical means hereinbefore described.

If the driver desires to make a right turn, he will rotate the rim 44 toward the right to move the spring contact 47 into engagement with the contacts 53 and 54 and to move the spring contact 46 into engagement with the contact 49 to close the circuit to the steering wheel switch 30. The electromagnet 112 of the relay 25 will again be energized in a manner described for a left hand turn to move the armature 110 into engagement with the contact bank 109, and the commutator brush 100 will again be energized in the manner hereinbefore described for a left turn. The engagement of the contact arm 47 of the steering wheel switch with the contact 53 will permit current to flow through the conductor 205 to the electromagnet 106 of relay 24 and out through ground 204. The energization of the electromagnet 106 will pull the armature 105 out of engagement with the contact bank 103 and pivot the same into engagement with the contact bank 104 to open the circuit through the contacts —2, —3, —4, —5, and —6 and to close the circuit through contacts 6, 5, 4, 3, and 2. All the lamps in all the banks 10, 11, 13 and 14 will now be energized as the commutator 101 engages the contacts 7, 6, 5, 4, 3, 2, and 1 of the commutator circle 102. As the commutator brush 100 rotates in clockwise direction, it will first engage the contact 7 to illuminate all of the number 7 lamps in each of the banks 10, 11, 13 and 14 in the same manner as hereinbefore described for a left turn. The current will flow from the contacts 6, 5, 4, 3, 2, to the contact plates 6, 5, 4, 3, 2, of the contact bank 104 and armature 105 of relay 24 through conductors 163, 162, 161, 160 and 159, and from the armature the current will be conveyed through conductors 191, 190, 189, 188 and 187 through relay 25 to the rear and dash bank 13 and 14, and along conductors 175, 174, 173, 172 and 171 to the front banks 10 and 11. As the commutator brush continues to sweep the contact circle 102, the lamps will be progressively illuminated from the number 7 lamp to the number 1 lamp to effect a moving beam of light travelling from left to right, thus notifying nearby motorists and pedestrians that the driver intends to make a right turn.

It may thus be seen that I have provided an electric signalling device that may be easily and expeditiously applied to an automotive vehicle and that is automatic in its action to effect a crisscross signal in the dash and rear bank of lights upon application of the foot brake or upon moving the gear lever into the reverse position. This circuit also has a speed sensitive switching means incorporated therein to automatically disconnect the crisscross signal and to flash the rear and dash lamps when the vehicle is nearing a dead stop. The device also includes a switch which is easily accessible to the finger tips of the driver when his hands are on the steering wheel and wherein the said switch may be actuated either to the right or left, when the driver rotates the steering wheel to make either a right or left hand turn, to close a circuit to all of banks of lamps. The steering wheel switch controls the right and left turn signals which are seen as a moving beam of light moving from left to right or from right to left in accordance with the direction in which the driver intends to turn the vehicle.

It is to be understood that the form of my invention, herewith shown and described, is to be taken as a preferred example of the same, and that various changes in the size, shape and arrangement of parts, may be resorted to without departing from the spirit of my invention, or the scope of the appended claims.

Having thus described my invention, I claim:

1. A speed sensitive vehicle signalling device comprising a power source; a pair of front right and left turn signalling banks of lamps, a rear signalling bank of lamps, and a dash mounted bank of indicator lamps; a manually actuated switch means connected to the power source; a second switching means connected with said power source by closing of the manually actuated switch including a series of contacts connected to said lamps, and a continuously moving arm sweeping said contacts for connecting the same to the power source and flashing the lamps; a third switching means also connected to said power source by closing of the manually actuated switch including a pair of spaced contacts connected to the lamps, and a continuously moving arm sweeping said contacts for connecting the lamps to the source of power and to alternately illuminate and extinguish all of said lamps; and a governor controlled switch electrically connected to the second and third switching means, said governor adapted to hold the switch open when the vehicle is travelling at a relatively high rate of speed to permit closing of the second switching means and to open the said third switching means and adapted to close the switch when vehicle slows to a preselected speed to disconnect the second switching means from the lamps and to electrically connect the third switching means thereto.

2. A vehicle signalling device comprising a power source; a pair of front right and left turn signalling banks of lamps, a rear signalling bank of lamps, and a dash mounted bank of indicator lamps; relays electrically connected to said lamps; electro-magnetic means for opening and closing said relays; a selector switch including a plurality of spaced contacts electrically connected with the relays and a continuously moving arm connected to the power source through the said relays sweeping said contacts for flashing the lamps; and a speed sensitive switch means electrically connected to the said electro-magnetic means, said last switch means being open when the vehicle is travelling at a relatively high rate of speed to prevent the electro-magnetic means from being energized and to maintain the relays in one position and being closed when the vehicle is travelling at a relatively low rate of speed to connect the electro-magnet with the power source and to throw the relay to a second position.

3. A vehicle signalling device comprising a pair of right and left turn signalling banks of lamps, a rear signalling bank of lamps, and a dash mounted bank of indicator lamps; circuit and control means for causing the lamps to be progressively illuminated from the opposite ends toward the middle; another circuit and control means for causing all of said lamps to be simultaneously flashed intermittently; a speed sensitive switch means connected with each of said circuit and control means, said speed sensitive switch being operative to close the first circuit and control means and to open the second circuit and control means when the vehicle is travelling at a relatively high rate of speed and operative to open the first circuit and control means and to close the second circuit and control means when the vehicle is travelling at a relatively slow rate of speed; a power source; and a manually actuated switch means connecting the power source with each of the above circuit and control means, said switch means being coactive with the brake of the vehicle whereby application of the brake to retard the speed of the vehicle will render the speed sensitive switch means automatically operative to determine the signal to be transmitted to the said lamps.

4. In a vehicle signalling device, a pair of right and left turn signalling banks of lamps, a rear signalling bank of lamps, and a dash mounted bank of indicator lamps; circuit and control means for causing the said lamps to be individually and progressively illuminated from the opposite ends thereof toward the middle; circuit and control means for causing the lamps to be simultaneously flashed intermittently; and other circuit and control means for causing the lamps to be progressively illuminated from the right to the left or from the left to the right; a manual selector switch means included in the last mentioned circuit and control means coactive with the control means therein in a manner whereby in one position the selector switch will cause the lamps to be progressively illuminated from left to right and in another position to cause the lamps to be progressively illuminated from right to left; and a speed sensitive switching means operative only when the manual selector switch is open for causing the first mentioned signal to be given when the vehicle is travelling at a relatively high rate of speed and for causing the second mentioned signal to be given when the vehicle is travelling at a relatively low rate of speed.

5. A vehicle signalling device comprising a bank of lamps for indicating a signal; circuit and control means for causing the lamps to be progressively illuminated from right to left; circuit and control means for causing the lamps to be progressively illuminated from left to right; a manual selector switch connected in the above circuits adapted in one position to energize one of the circuits and in another position to energize the other of the circuits; circuit and control means for causing the lamps to be simultaneously progressively illuminated from right to left and from left to right; and a speed sensitive switch means operative only when the selector switch is open for causing the last signal to be given when the vehicle is travelling within preselected speed limits.

6. In a signalling device, a plurality of lamps for indicating a signal; circuit and control means for causing the lamps to be progressively illuminated from left to right; another circuit and control means for causing the lamps to be progressively illuminated from right to left; a selector switch adapted in one position to energize only the first circuit and control means, in another position to energize only the second circuit and control means and in a third position to energize neither of the circuit and control means; a circuit and control means for causing the lamps to be progressively illuminated simultaneously from right to left and from left to right; circuit and control means for causing all of said lamps to be flashed intermittently; and a speed sensitive control means operative only when the said selector switch is in the last named position, said speed sensitive switch automatically energizing only the third mentioned circuit and control means when the vehicle is travelling at a relatively high rate of speed and automatically energizing only the last mentioned circuit and control means when the vehicle is travelling at a relatively low rate of speed.

7. In a vehicle signalling device, a pair of right and left turn signalling banks of lamps, a rear signalling bank of lamps, and a dash mounted bank of indicator lamps; a first circuit and control means for causing the said lamps to be individually and progressively illuminated from the opposite ends thereof toward the middle; a second circuit and control means for causing the lamps to be simultaneously flashed intermittently; a third circuit and control means for causing the lamps to be progressively illuminated from the right to the left or from the left to the right; a power source; a selector switch means adapted, in one position, to exclusively connect the third circuit and control means with the power source whereby the lamps will be progressively illuminated from right to left and in another position to exclusively connect the third circuit and control means with the power source in a manner whereby the lamps will be progressively illuminated from left to right; and a speed sensitive switch means operative only when the said selector switch is open, adapted to exclusively connect the second circuit and control means with the power source when the vehicle is travelling at a relatively high rate of speed and to exclusively connect the first circuit and control means to the power source when the vehicle is travelling at a relatively slow rate of speed.

IRVIN G. H. HERWIG.